E. PIQUEREZ.
LUBRICATOR.
APPLICATION FILED AUG. 20, 1920.
Reissued Dec. 5, 1922. 15,503.
2 SHEETS—SHEET 1.
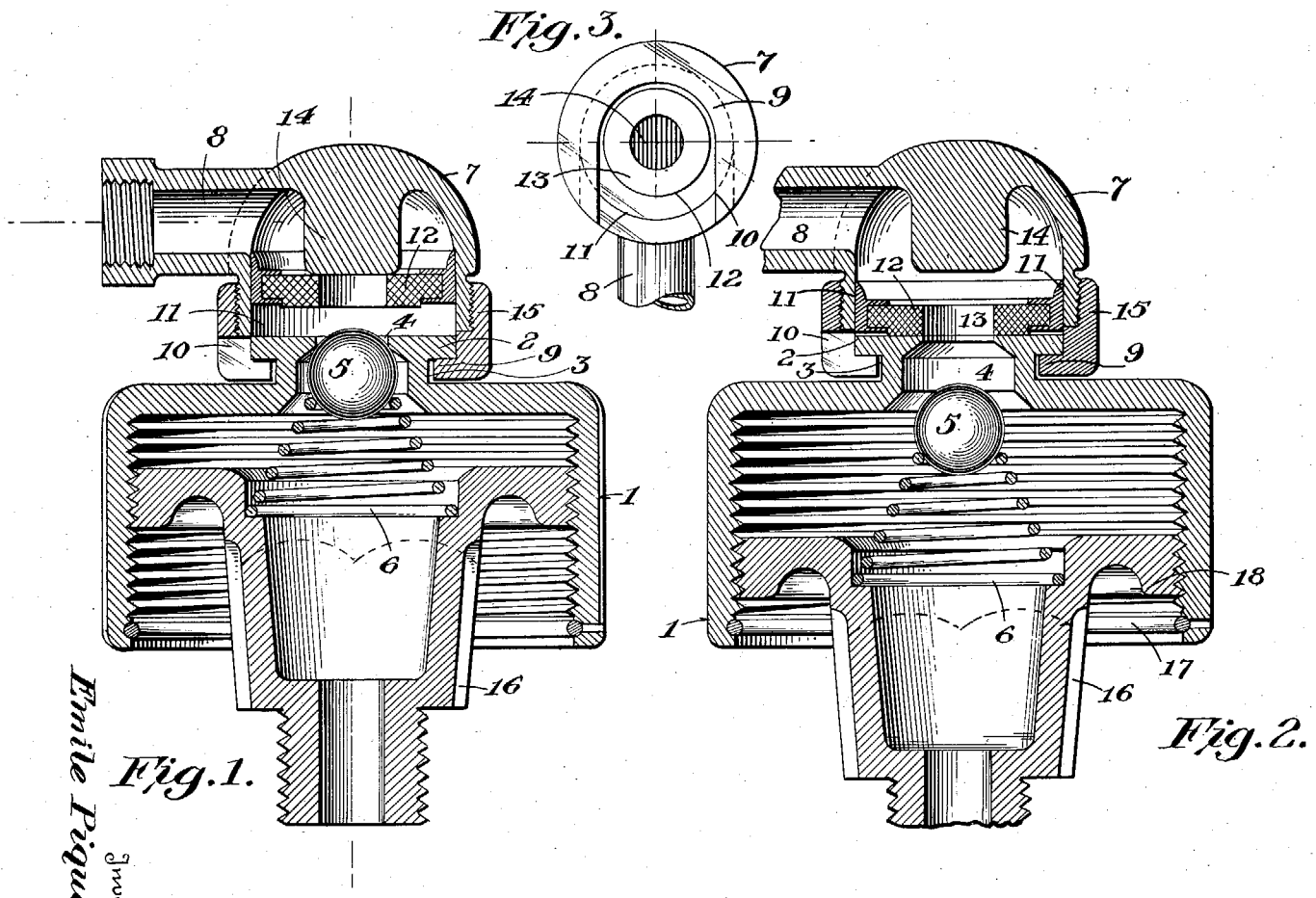
Inventor
*Emile Piquerez*
By Fraser, Turk & Myers
Attorneys

E. PIQUEREZ.

LUBRICATOR.

APPLICATION FILED AUG. 20, 1920.

Reissued Dec. 5, 1922.

15,503.

2 SHEETS—SHEET 2.

Inventor

Émile Piquerez

By Fraser, Turk & Myers

Attorneys

Reissued Dec. 5, 1922. Re. 15,503

UNITED STATES PATENT OFFICE.

EMILE PIQUEREZ, OF ST.-URSANNE, SWITZERLAND, ASSIGNOR, BY MESNE ASSIGNMENTS, TO THE BASSICK MANUFACTURING COMPANY, OF CHICAGO, ILLINOIS, A CORPORATION OF DELAWARE.

LUBRICATOR.

Original No. 1,276,106, dated August 20, 1918, Serial No. 222,542, filed March 15, 1918. Application for reissue filed August 20, 1920. Serial No. 404,918.

*To all whom it may concern:*

Be it known that I, EMILE PIQUEREZ, a citizen of the Swiss Republic, residing at Fabrique Thekla, St.-Ursanne, Switzerland, have invented certain new and useful Improvements in Lubricators, of which the following is a specification.

Lubricators of the hand operated force feed type are known, which have a special orifice for charging them, so that in effecting such charging it is not necessary to unscrew the cover completely from the lubricator body. Nevertheless such lubricators are not constructed for containing grease or a lubricant of semi-solid consistency because up to the present, all attempts to construct such lubricators in such a manner as to allow of introducing the lubricant through an orifice provided for this purpose in the cover, have failed owing to the loss of lubricant which counterbalances the advantages of keeping the lubricant clean and of rapidity in charging that are obtained.

The object of the present inventor has been to produce a lubricator provided with a device which will allow of charging the lubricator with a semi-solid lubricant without loss through a hole provided for this purpose.

The present invention has now for its object to provide an improved lubricator of the hand operated force feed type for a semi-solid lubricant, formed with a charging orifice for the introduction of the lubricant, and characterized by the novel feature that it comprises mounted on a flange arranged concentrically to the charging orifice, a charging device consisting of a hood in which a perforated piston is adapted to work, the whole being so constructed and arranged that in the charging operation, the piston is caused to free its orifice or perforation so as to allow the lubricant to pass through.

The manner in which this invention is to be performed will now be more particularly described with reference to the accompanying drawings which illustrate by way of example a constructional form of a lubricator according to the present invention.

In these drawings:

Figure 1 is a central longitudinal section showing the lubricator closed.

Fig. 2 is a similar section showing the lubricator open for charging.

Fig. 3 is an underside view of the coupling member with the hood and perforated piston contained therein.

Figure 4:
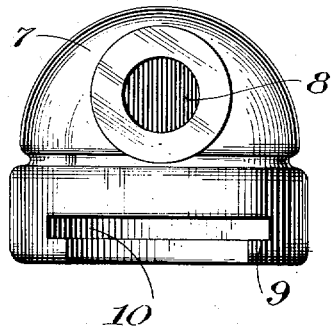
Fig. 4 is a rear view of the hood.

In the example shown, the cover 1 of the lubricator is formed with a flange 2 that is concentric to the charging orifice 4. The orifice 4 is normally closed by a ball 5. 6 is a spring having a constant tendency to press the ball 5 against its seat so as to close the charging orifice 4.

A hood 7 formed with a tubular union 8 (which constitutes a supply pipe for admitting lubricant under pressure) is adapted to fit and be connected to the flange 2. The connection is effected by means of a coupling member 15 shown in underside view in Fig. 3. This coupling member has a tongue 9 designed to engage in the annular groove 3 formed between the flange and the cover.

Figure 5:
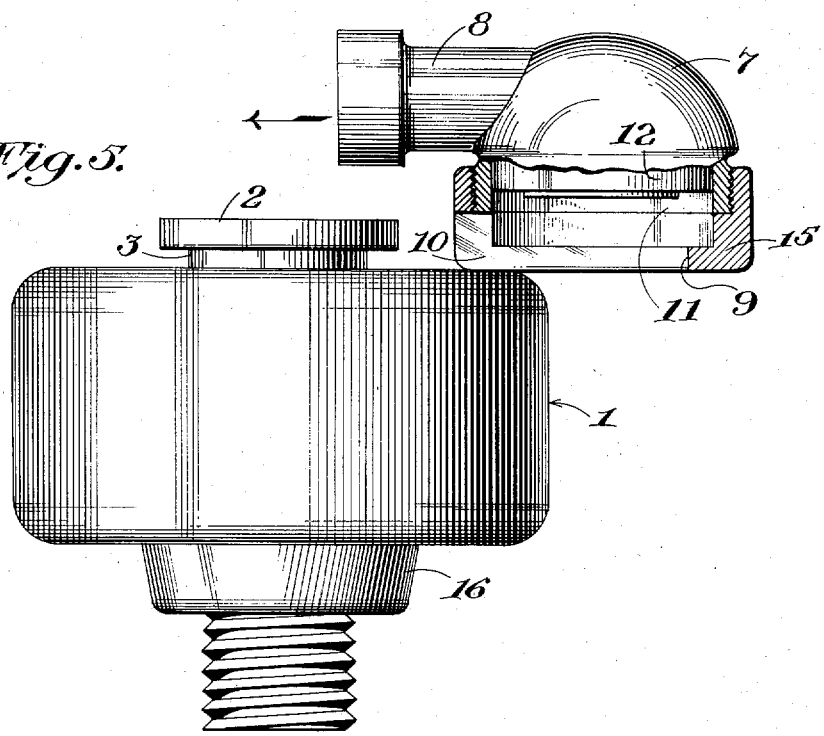
Fig. 5 is a sectional elevation, showing the operation of coupling.

The hood is fitted on to the lubricator by inserting the flange 2 through the gap 10. This is accomplished by a movement in the direction of the arrow in Fig. 5, being in a plane parallel with the top of the lubricator, and perpendicular to the axial direction of flow of the lubricant into the lubricator. The flat top of the cover 1 of the lubricator may be used to assist in guiding the parts into engagement.

The hood 7 is formed with an interior chamber or cylindrical portion 11 in which a piston 12 perforated with an orifice 13 is adapted to work. It will be noted, from an inspection of Figure 2, that the portion of the piston 12 in contact with the flat ceiling surface surrounding the charging orifice of the lubricator is smaller in area than the inner face or end of the piston which is subjected to the pressure of the lubricant. This construction not only permits air pressure to act upon the piston to push it inwardly when the pressure upon the lubricant is reduced or relieved, but also causes the pressure upon a unit area of the surface of the piston, in contact with the lubricator, to greatly exceed the corresponding pressure of the lubricant per unit area. The orifice 13 is closed by a plug 14 when the piston 12 is in its outermost position.

The cover 1 is provided with an outwardly expanding spring 17 which is engaged in an annular groove and by bearing against the screw-threaded portion 18 of the lubricator foot 16, prevents the cover 1 from being completely unscrewed from the lubricator.

The charging of the lubricator is effected in the following manner:

The positions of the various parts when at rest are shown in Fig. 1. The tubular union 8 is adapted to be connected to a syringe filled with lubricant. When the hood 7 has been fixed upon the flange 2, after having unscrewed the cover as far up as possible, the lubricant is injected into the charging device under pressure. This pressure causes the piston 12 to move down and thus uncover its orifice so as to allow the lubricant being charged to pass through and act upon the ball 5 which being thereby forced away from its seat allows the lubricant to pass through the charging orifice and fill the lubricator. The relative positions of the various parts will then be as shown in Fig. 2. When the lubricator is filled, the operator will notice an increase in the resistance to the charging operation; the plunger of the charging syringe is then drawn back and the resulting suction allows the ball 5 to move back on to its seat, and also causes the piston 12 to move up against the plug 14 which thus closes again the orifice 13 in the piston. The hood 7 can then be removed without the slightest loss of lubricant.

The piston 12 forms a packing which makes a tight joint against the top of the flange 2 of the lubricator. The piston is forced against this flange by the internal fluid pressure, so that the greater the pressure the tighter the joint. The reaction of this pressure is transmitted through the coupling member 15 to the shoulder on the underside of the flange 2. Thus the coupling is held to the lubricator with a force proportional to the fluid pressure; and upon the release of the pressure the coupling is freed for the easy removal of the hood.

What I claim is:—

1. A device for use in filling lubricators comprising a cylinder adapted to be attached to the lubricator with its interior communicating with the interior of the lubricator, a supply pipe for the cylinder, a piston movably mounted in the cylinder, a passage for permitting the lubricant to pass by the piston, and means for normally closing said passage, whereby on lubricant being forced with pressure through the supply pipe into said cylinder, said piston will be forced away from the means normally closing the passage so as to allow the charged lubricant to pass through the passage and enter the lubricator.

2. A device for use in filling lubricators comprising a cylinder adapted to be attached to the lubricator with its interior communicating with the interior of the lubricator, a supply pipe for the cylinder, a piston movably mounted in the cylinder and provided with a passage for permitting the lubricant to pass the cylinder, and a plug located in the cylinder for normally closing said passage, whereby on semi-solid lubricant being forced with pressure through the supply pipe into the cylinder, said piston will be moved away from the plug so as to allow the charged lubricant to pass through the passage in said piston and enter the lubricator.

3. A device for use in filling lubricators comprising a hood having a supply pipe; a cylinder carried by the hood and provided with means for connecting the cylinder to the hood, the interior of the cylinder and the interior of the lubricator being in communication when the parts are connected, a piston movably mounted in said cylinder and provided with a centrally disposed passage, and a centrally disposed plug carried by the hood and normally closing the passage in the piston.

4. A device for use in filling lubricators comprising a cylinder member adapted to be detachably connected to the lubricator with its interior communicating with the interior of the lubricator, a plug carried by said cylinder member, a piston located in said cylinder and having an aperture normally closed by said plug, and a tubular supply member for the cylinder member extending at right angles to the cylinder member, whereby on lubricant being forced with pressure through the supply member into said cylinder member, said piston will be forced away from said plug so as to allow the charged lubricant to pass through the piston, aperture and enter the lubricator.

5. A device for use in filling lubricators, comprising a hood having an interior chamber, coupling means for connecting the hood to the lubricator, an internal packing movable under the pressure of the lubricant in said chamber to seal the joint with the lubricator and tighten the coupling engagement, and a tubular supply member for the hood extending at right angles to the direction of flow of the lubricant from said chamber into the lubricator.

6. A device for filling lubricators comprising a hood having an interior chamber and a supply pipe thereto, coupling means on said hood adapted to engage the lubricator to hold the hood thereto and movable to so engage or disengage the hood in a direction perpendicular to the direction of flow into the lubricator, and an internal packing exposed to the pressure in said chamber and transmitting such pressure to the lubricator to seal the joint therewith and to tighten the coupling engagement.

7. A device for filling a lubricator which has a top opening and a locking shoulder beneath, said device comprising a hood having an interior chamber, a supply pipe thereto and a coupling member, the latter having portions engaging under such shoulder by a movement in a plane transverse to the direction of flow of the lubricant into the lubricator, and a movable part responding to fluid pressure in said chamber and pressing against the lubricator to tighten the coupling engagement.

8. A device for filling a lubricator comprising a hood having a cylindrical chamber and a supply pipe thereto, means for coupling it to the lubricator by an engaging movement at right angles to the axis of said chamber, and a piston movable under fluid pressure in said chamber and adapted to seal the joint with the lubricator and tighten the coupling engagement proportionally to the internal pressure.

9. A device for filling a lubricator comprising a hood having an interior chamber and a supply pipe thereto, coupling means on said hood for connecting it to the lubricator consisting of a member having a tongue to engage under a flange on the lubricator, such tongue being in a plane parallel to the joint with the lubricator, and engaging the lubricator by a movement transverse thereto, and a movable part responding to fluid pressure in said chamber and pressing against the lubricator to tighten the coupling engagement.

10. A device for filling a lubricator which has a top charging orifice and a flange forming a locking shoulder, said device comprising a hood having an interior chamber and a supply pipe projecting laterally therefrom, coupling means on said hood for connecting it to the lubricator including a tongue entering beneath the flange on the lubricator, and open on the same side as the supply pipe, and an internal part movable in response to fluid pressure in said chamber and pressing against the lubricator to tighten the joint and coupling proportionally to such pressure.

11. The combination with a lubricator having a top charging orifice and an external flange, and internal means for closing said orifice, of a device for filling such lubricator comprising a hood having an interior chamber and a supply pipe thereto, coupling means on the hood for engaging such flange by a movement parallel thereto, and a movable part responding to fluid pressure in said chamber and pressing against the lubricator to tighten the coupling engagement.

12. The combination with a lubricator having a flat top and an inlet portion projecting therefrom with a shoulder parallel to said flat top, of a device for filling such lubricator comprising a hood having an interior chamber and a supply pipe thereto, coupling means on the hood for engaging such shoulder, by a movement parallel to said flat top, and having a part adapted to engage said flat top to be guided thereby in its coupling movement, and a movable part responding to fluid pressure in said chamber and pressing against the lubricator to tighten the coupling engagement.

13. A device for filling lubricators comprising a hood having an interior chamber and a supply pipe thereto, means adapted to attach said hood to a lubricator, an internal packing movable in response to fluid pressure, having a passage for outflow of lubricant, and means in said chamber for closing said passage when the packing is drawn back under suction.

14. A device for filling lubricators comprising a hood having an interior chamber and a supply pipe thereto, means adapted to attach said hood to a lubricator, an internal packing movable in response to fluid pressure, having a passage for outflow of lubricant and a plug for normally closing said passage, whereby on lubricant being forced into said chamber the packing will be moved away from the plug to allow the lubricant to flow into the lubricator.

15. The combination with a lubricator of means for filling said lubricator comprising a hood, said lubricator and hood having co-acting means for detachably connecting said hood to said lubricator by a movement of said hood transversely of said lubricator, and means responsive to fluid pressure in said hood for locking said hood to said lubricator and for sealing the connection between said hood and lubricator.

16. The combination with a lubricator of means for filling said lubricator comprising a hood, said lubricator and hood having co-acting means for detachably connecting said hood to said lubricator by a movement of said hood transversely of said lubricator, and means responsive to fluid pressure in said hood for locking said hood to said lubricator.

17. A device for filling lubricators, comprising a hood having an interior chamber for holding lubricant under pressure and a passage for outflow of lubricant, and means responsive to the relief of the pressure on the lubricant in said hood.

18. The combination with a lubricator having a charging orifice surrounded by a sealing surface, of a device for charging said lubricator comprising means for making a detachable connection with said lubricator, and a packing movable in said device having a face for contacting with said sealing face and a larger face subjected to the pressure of the lubricant in said device.

19. The combination with a lubricator having a charging orifice surrounded by a sealing surface, of a device for charging said lubricator comprising means for making a detachable connection with said lubricator, and a differential piston, a portion of the outer face of which contacts with said sealing surface, the remaining portion of the outer face being exposed to air pressure, and the inner face of which is subjected to the pressure of the lubricant in said device.

20. The combination with a lubricator having a charging orifice, of means for filling said lubricator comprising a hollow member for conducting the lubricant under pressure, and a sealing member actuated by the pressure of the lubricant in the hollow member for making a sealing contact with said lubricator having a greater pressure per unit area than the pressure of said lubricant per unit area.

21. A device for filling a lubricator comprising a hollow member for holding lubricant under pressure, a piston slidable in said hollow member and having one end subjected to the pressure of the lubricant in said hollow member, the other end of said piston comprising means for making a sealed contact with the lubricator, and being smaller in area than said first named end.

In witness whereof, I have hereunto signed my name.

EMILE PIQUEREZ.